United States Patent

Goto et al.

[11] Patent Number: 5,823,641
[45] Date of Patent: *Oct. 20, 1998

[54] CABINET FOR MONITOR DEVICE

[75] Inventors: Mitsuru Goto; Masahiro Miura, both of Tokyo, Japan

[73] Assignee: Sony Corporation, Tokyo, Japan

[*] Notice: The term of this patent shall not extend beyond the expiration date of Pat. No. 5

[21] Appl. No.: 695,578

[22] Filed: Aug. 12, 1996

[30] Foreign Application Priority Data

Aug. 18, 1995 [JP] Japan ................................. 7-232064

[51] Int. Cl.⁶ ...................................................... H04N 5/64
[52] U.S. Cl. ............................................. 312/7.2; 348/836
[58] Field of Search ............................... 312/7.2; 348/836, 348/839

[56] References Cited

U.S. PATENT DOCUMENTS

| 2,980,478 | 4/1961 | Woehrle | 312/7.2 |
| 4,411,480 | 10/1983 | Gibson | 312/7.2 |
| 4,635,809 | 1/1987 | Bechman et al. | 312/7.2 X |
| 4,662,531 | 5/1987 | Ramspacher et al. | 312/7.2 X |
| 5,363,150 | 11/1994 | Kojima | 312/7.2 X |
| 5,575,545 | 11/1996 | Wang | 312/7.2 |

FOREIGN PATENT DOCUMENTS

| 2554299 | 5/1985 | France | 312/7.2 |
| 121880 | 7/1983 | Japan | 312/7.2 |

Primary Examiner—Peter M. Cuomo
Assistant Examiner—David E. Allred
Attorney, Agent, or Firm—Jay H. Maioli

[57] ABSTRACT

In the assembly process of a cabinet, the work process involving the insertion of screws and costs of assemblies such as screws can be reduced. A front cabinet (1) has on its upper surface formed an engaged portion (4) and a rear cabinet (2) has on its upper surface formed an engagement portion (6) at a position corresponding to the engaged portion of the front cabinet (1). In the assembly process of the cabinet, the upper surface of the cabinet is engaged by the engagement portion (6) and the engaged portion (4).

4 Claims, 5 Drawing Sheets

CABINET FOR MONITOR DEVICE

BACKGROUND OF THE INVENTION

The present invention relates to a cabinet for monitor device.

FIGS. 1A and 1B of the accompanying drawings are an assembly top view and an assembly side view illustrative of a front cabinet and a rear cabinet of a television receiver, for example.

As illustrated in FIGS. 1A and 1B, a cabinet of a television receiver comprises a front cabinet 21 and a rear cabinet 22.

Main portions of television receiver such as a video output portion and a circuit board are situated in the front cabinet 21, though not shown, and the front cabinet has screw coupling portions 23, shown by dashed lines, formed on the side surface of the portion where it is assembled with the rear cabinet 22.

On the other hand, the rear cabinet 22 has a screw attachment portion 24 formed at its position corresponding to the screw coupling portion formed on the front cabinet 21.

The screw coupling portion 23 formed on the front cabinet 21 and the screw attachment portion 24 formed on the rear cabinet 22 are disposed on the four corners of the cabinet side surface.

In the assembly process of the cabinet of such television receiver, after the front cabinet 21 and the rear cabinet 22 are assembled, the front cabinet 21 and the rear cabinet 22 are combined and fixed by inserting screws 25 into the screw attachment portions 24 from the rear surface of the rear cabinet 22.

However, in the assembly process of the cabinet for a television receiver, since the front cabinet 21 and the rear cabinet 22 are combined by inserting the screws 25 into the screw attachment portions 24 provided on the rear cabinet 22, work involving the insertion of the screws and costs of assemblies such as screws are generated. The work involving the insertion of screws and the cost of assemblies should preferably be minimized from a standpoint of manufacturing efficiency.

SUMMARY OF THE INVENTION

In view of the aforesaid aspect, it is an object of the present invention to provide a cabinet for a monitor device whose assembly process can be simplified and which can be made inexpensively.

According to the present invention, there is provided a cabinet for monitor device which is comprised of a front cabinet, a rear cabinet, an engagement portion formed on one of the front cabinet and the rear cabinet, and an engaged portion formed on the other of the front cabinet and the rear cabinet at a position corresponding to the engagement portion, wherein the front cabinet and the rear cabinet are assembled together by engaging the engagement portion and the engaged portion.

According to the present invention, since the engaged portion is formed on the upper surface of the front cabinet, for example, and the rear cabinet has the engagement portion formed on its upper surface at the position corresponding to the engaged portion of the front cabinet, the upper surface portion of the cabinet is engaged. Therefore, in the assembly process of the television receiver, the upper surface of the cabinet need not be fixed by screws, and work involving the insertion of screws and the cost of assemblies such as screws can be reduced.

DETAILED DESCRIPTION OF THE PREFERRED EMBODIMENT

The present invention will now be described with reference to the drawings.

Figure 1A:
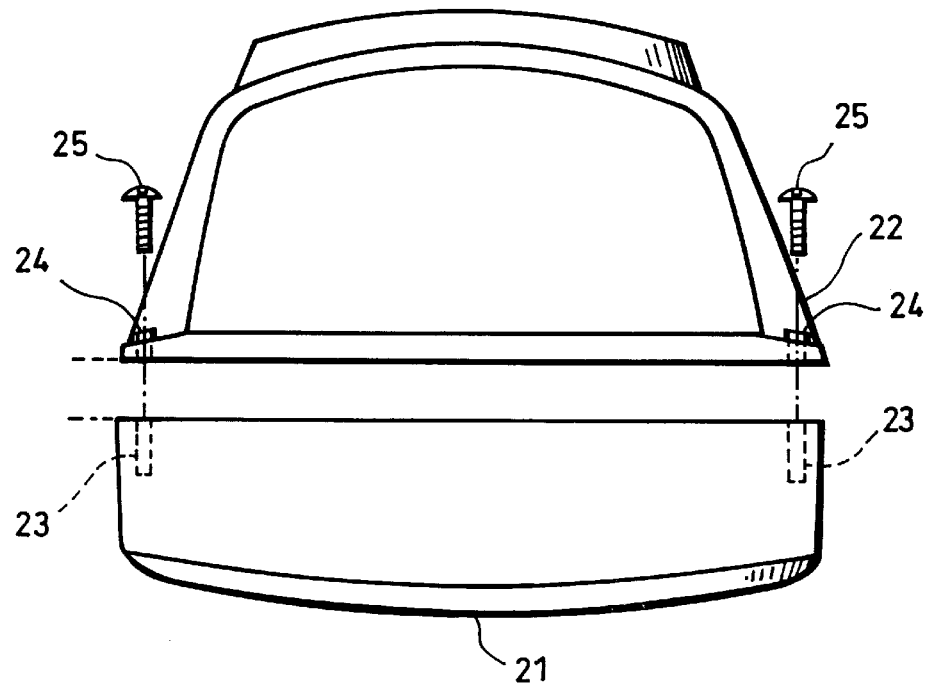
FIGS. 1A and 1B are an assembly top view and an assembly side view illustrative of a cabinet for a television receiver, respectively.
Figure 1B:
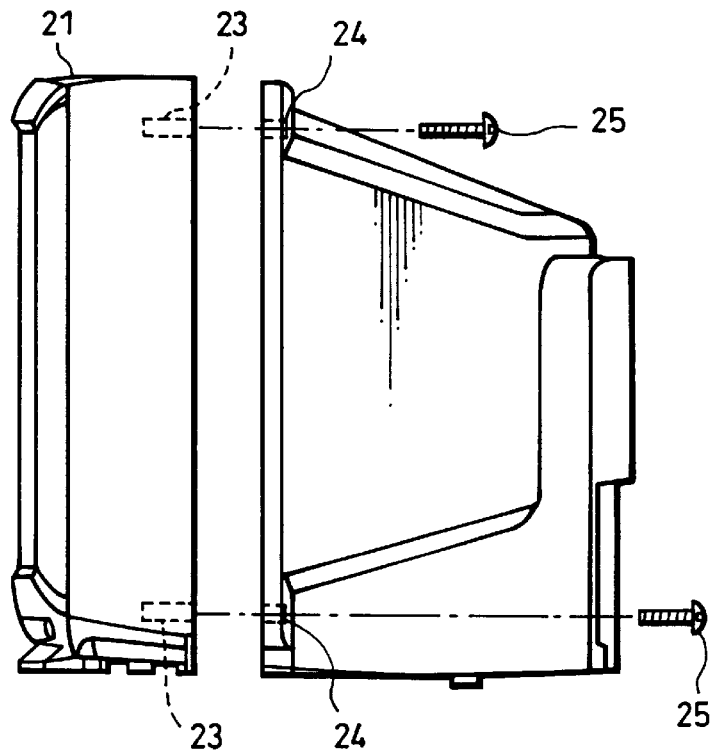
Figure 2A:
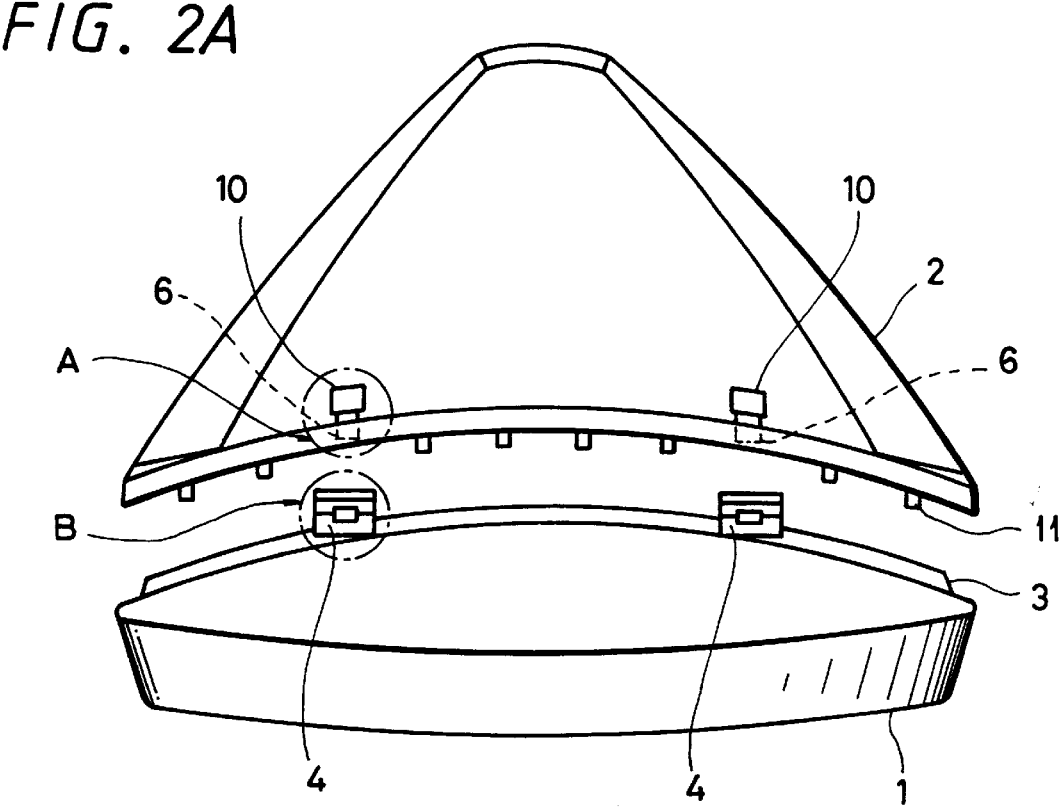
FIGS. 2A and 2B are an assembly top view and an assembly side view illustrative of a cabinet for a television receiver according to an embodiment of the present invention, respectively.
Figure 2B:
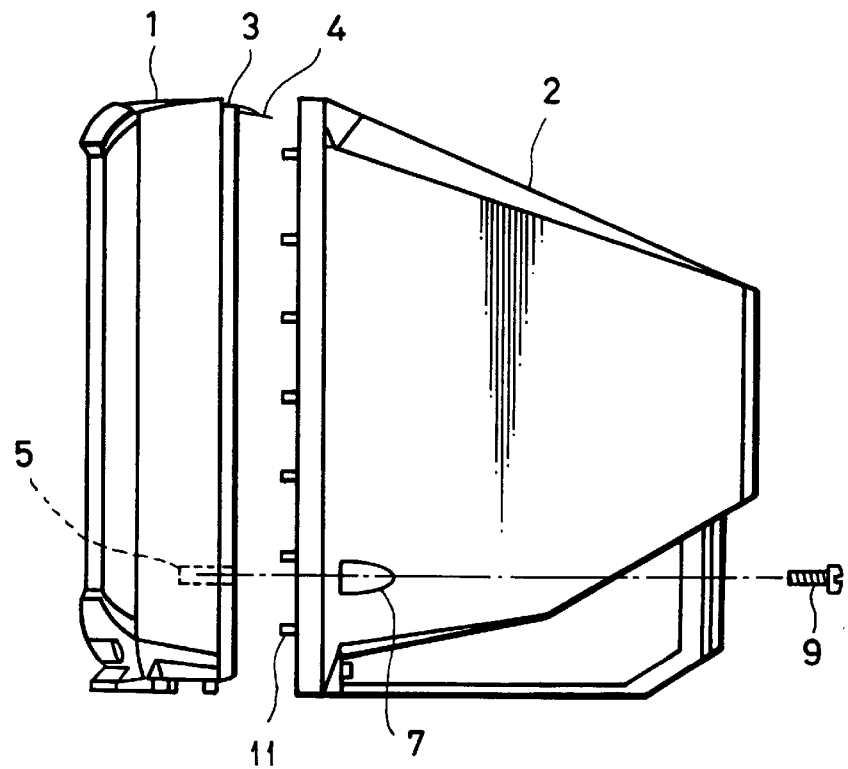

FIGS. 2A and 2B are an assembly side view and an assembly top view illustrating a front cabinet and a rear cabinet applied to a television receiver according to the present invention.

As illustrated in FIGS. 2A and 2B, a cabinet for a television receiver according to the embodiment of the present invention is formed by a combination of a front cabinet 1 and a rear cabinet 2.

Main portions of a television receiver such as a video output portion and a circuit board are disposed in the front cabinet 1, though not shown. Also, a guide line 3 extended along the inner periphery of the opening portion of the rear cabinet 2 is formed on the surface in which the front cabinet is combined with the rear cabinet 2.

Engaged portions 4 are formed on the right and left of the guide line 3 on the upper surface of the front cabinet 1 as will be described later on.

A screw coupling portion 5 is provided on the bonding surface of the front cabinet 1 with the rear cabinet 2 at the lower portion position of the side surface as shown by a dashed line in FIG. 2B.

On the other hand, as seen from the top surface, the rear cabinet 2 is formed in a substantially triangular shape in which the rear surface portion of the cabinet is a vertex angle. Also, an engagement portion 6, which will be described later on, is formed on a cabinet inner wall portion corresponding to the above described engaged portion 4.

Guide portions 11 protruding in the forward direction are formed in the inner wall portion of the rear cabinet 2 at a predetermined interval.

Furthermore, the rear cabinet 2 has opening portions 10 for releasing engagement defined at the positions at which they oppose the engagement portions formed on the upper surface.

As shown in FIG. 2B, a recess 7 is formed on the side surface of the rear cabinet 2, for example, and the recess portion 7 has formed therein a screw attachment portion corresponding to the screw coupling portion 5 provided on the front cabinet 1, though not shown.

The engaged portion 4 formed on the front cabinet 1 and the engagement portion 6 formed on the rear cabinet 2 will be described with reference to FIGS. 3A, 3B to FIG. 5.

Figure 3A:
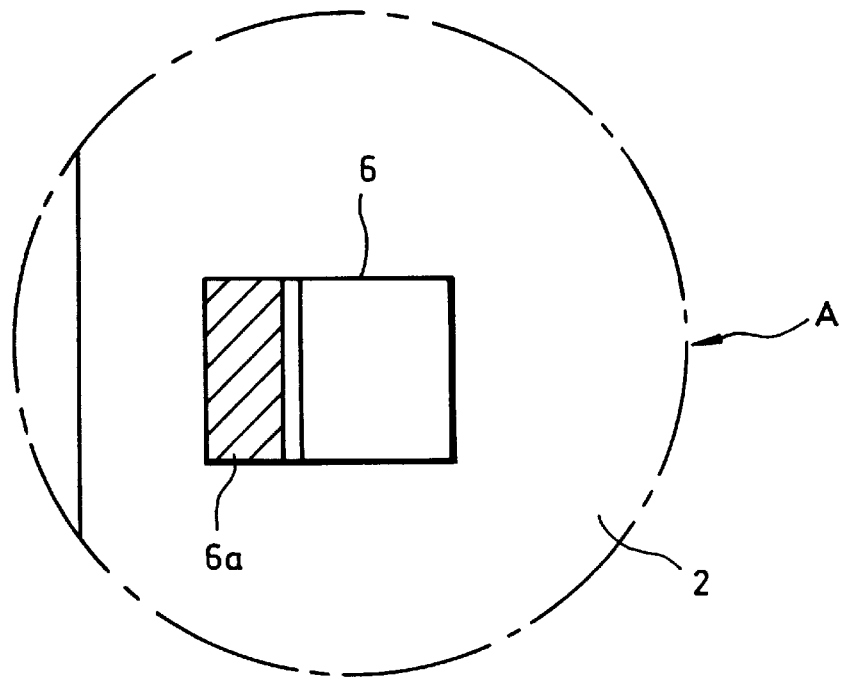
FIGS. 3A and 3B are a plan view and a cross-sectional view illustrative of an engagement portion formed on a rear cabinet, respectively.
Figure 3B:
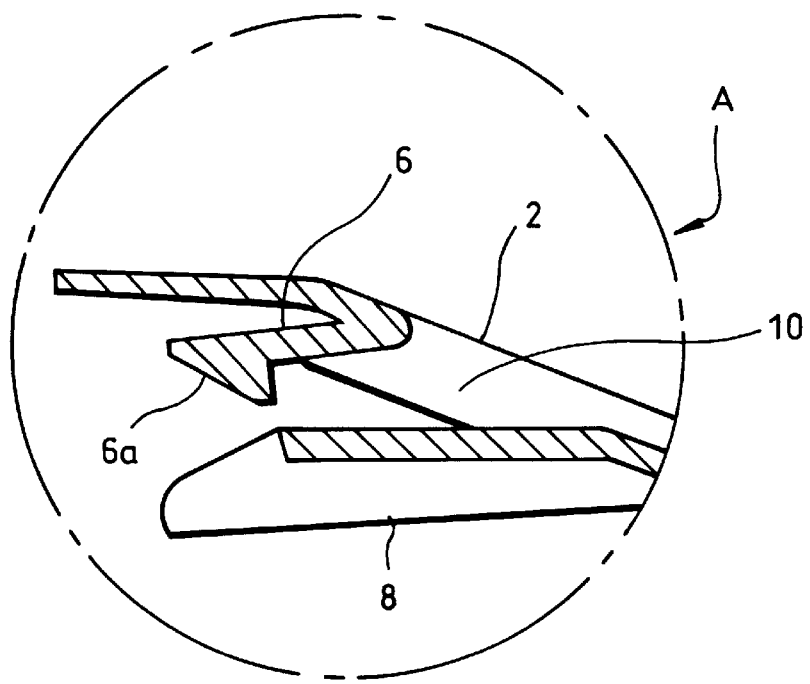

FIGS. 3A and 3B are a plan view and a cross-sectional view illustrating the engagement portion 6 shown in a circle A of FIG. 2A in an enlarged scale.

As shown in FIGS. 3A and 3B, the engagement portion 6 is integrally formed with the inner wall portion of the rear cabinet 2 and the tip end thereof is formed as an inclined portion 6a.

The guide portion 8 is adapted to introduce the engaged portion 4 formed on the front cabinet 1, which will be described later on, into a proper position.

Figure 4A:
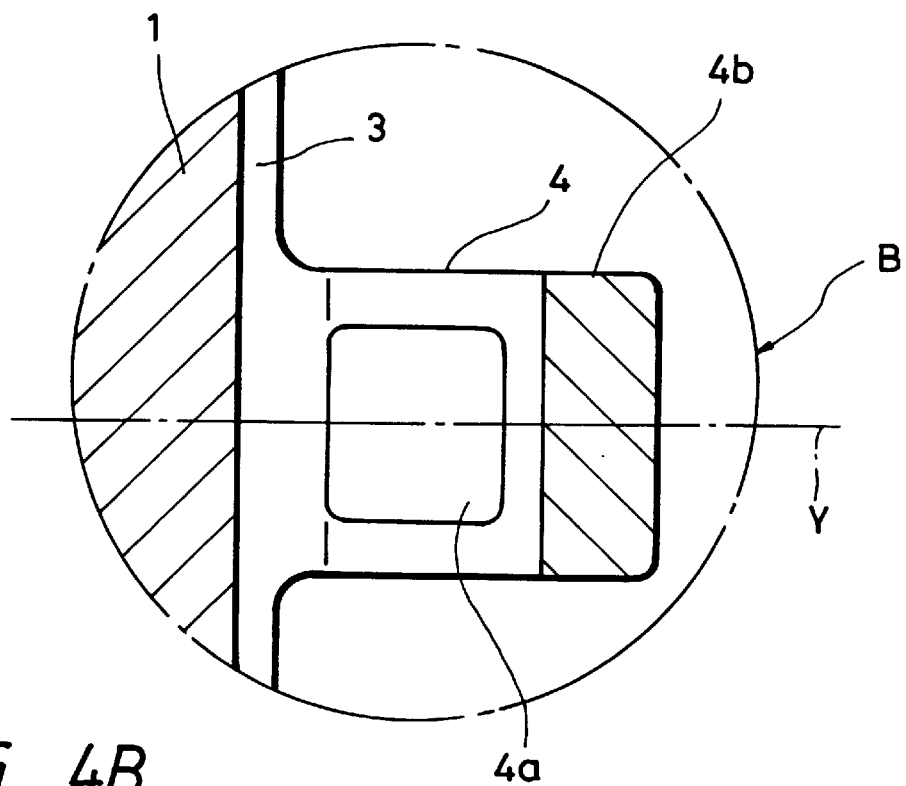
FIGS. 4A and 4B are a plan view and a cross-sectional view illustrative of an engaged portion formed on a front cabinet, respectively.
Figure 4B:
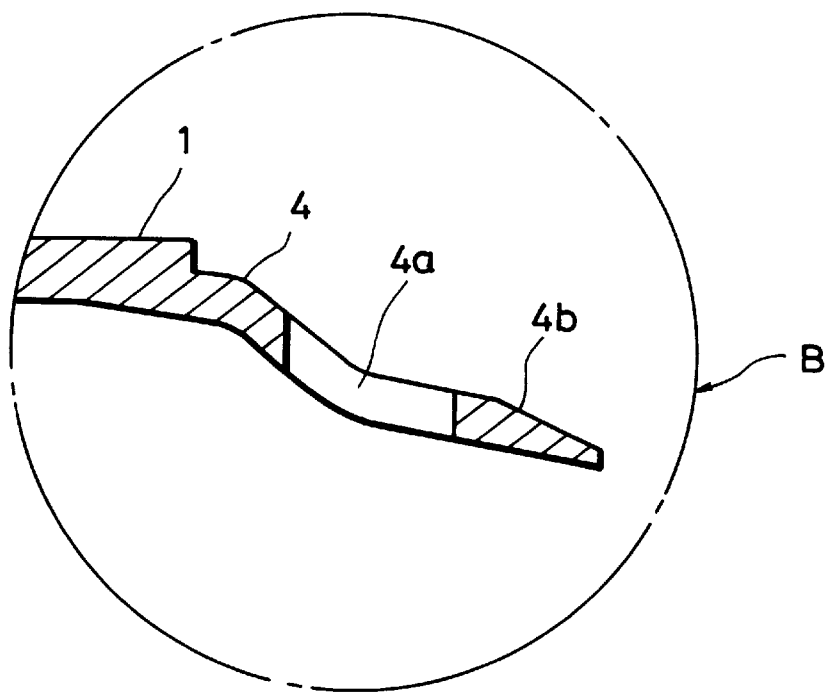

FIG. 4A is a plan view illustrating the engaged portion 4 shown in a circle B of FIG. 2A in an enlarged scale, and FIG. 4B is a cross-sectional view taken along the dot-and-dash line in FIG. 4A.

As shown in FIGS. 4A and 4B, the engaged portion 4 is integrally formed with the guide line 3 formed on the front cabinet 1, for example.

The engaged portion 4 has defined at its substantially intermediate portion an engagement aperture 4a, and the tip end of the engaged portion is formed as an inclined portion 4b.

In the assembly process of the cabinet for a television receiver, the cabinet 2 is moved forward toward the rear of the front cabinet 1 and then assembled with the cabinet.

In this case, the inclined portion 4b of the engaged portion 4 formed on the front cabinet 1 and the inclined portion 6a of the engagement portion 6 formed on the rear cabinet 2 are contacted with each other. Then, when the rear cabinet 2 is further moved forward, the engagement portion 6 and the engaged portion 4 are opened in the opposite directions and the rear cabinet 2 is pushed to a predetermined position, whereby the engagement portion 6 of the rear cabinet 2 is fitted into the engagement aperture 4a of the engaged portion 4 formed on the front cabinet 1 as shown in FIG. 5.

Specifically, when the front cabinet 1 and the rear cabinet 2 are assembled together, the upper surface portion of the cabinet is engaged by the engagement portion 6 formed on the rear cabinet 2 and the engaged portion 4 formed on the front cabinet 1.

Accordingly, in the assembly process of the cabinet for television receiver according to the embodiment of the present invention, when the cabinets are assembled, the upper surface portion of the cabinet is engaged. Thereafter, as shown in FIGS. 2A and 2B, the front cabinet and the lower side surface portion of the rear cabinet 2 are fixed together by inserting screw 9 into the screw attachment portion formed in the recess portion 7 of the rear cabinet 2, whereby the assembly work of the whole cabinet is finished. Therefore, the screwing work for fixing the upper surface of the cabinet can be reduced. Thus, the work process involving the insertion of screws and cost of assemblies such as screws can be reduced.

Figure 5:
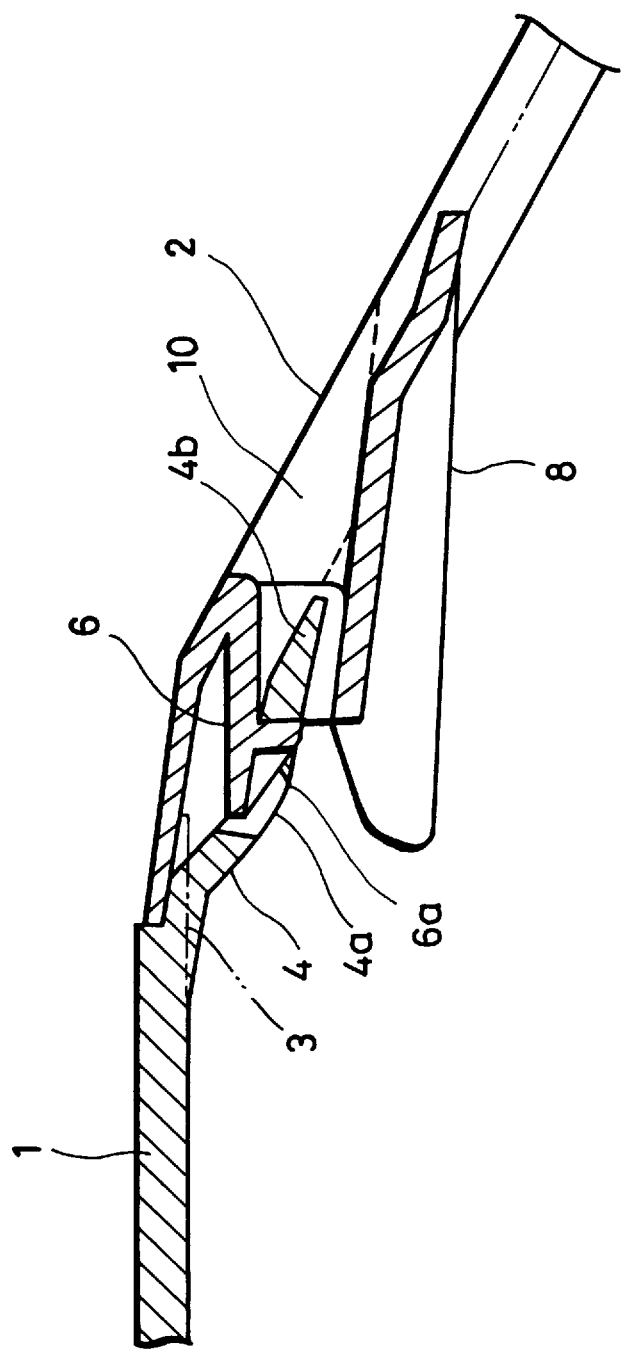
FIG. 5 is a cross-sectional view illustrating a manner in which the engagement portion and the engaged portion are engaged with each other.

Since the engaged portion and the engagement portion formed in the front cabinet and the rear cabinet are formed within the cabinet as shown in FIG. 5, an appearance of the cabinet can be prevented from being degraded.

When the engagement between the front cabinet 1 and the rear cabinet 2 is released, the engagement portion 6 and the engaged portion 4 are opened by inserting a screwdriver or the like into the opening portion 10 defined in the rear cabinet 2.

While the cabinet for a television receiver was described so far in the embodiment of the present invention, the present invention is not limited thereto, and may be applied to a wide variety of cabinets for monitor devices.

While the engagement portion is formed on the upper surface of the cabinet and the two places of the upper surface of the cabinet are fixed by the engagement portions, the present invention is not limited thereto, and the bottom surface of the cabinet, for example, may be fixed by the engagement portions. Furthermore, if a sufficient strength required for assembling the cabinet can be obtained, then the number of the engagement portions may be increased.

As described above, according to the cabinet for a monitor device of the present invention, since the front cabinet or the rear cabinet has an engagement portion and the other of the front cabinet or the rear cabinet has an engaged portion at its position corresponding to the engagement portion, in the assembly process of the cabinet, the work process involving the insertion of screws and cost of assemblies such as screws can be reduced.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A cabinet for a monitor device comprising:

a front cabinet;

a rear cabinet; and a pair of fasteners, each of said fasteners including one engagement portion having a first flexible and deflectable member and a guide formed on an upper inner wall portion of one of said front cabinet and said rear cabinet, wherein said first flexible and deflectable member has an inclined portion formed thereon at a tip end thereof and an engaging surface proximal to said inclined portion and wherein a gap is formed between said first flexible and deflectable member and said guide; and one engaged portion having a second flexible and deflectable member with an engagement aperture formed therein and being formed on an upper inner wall portion of the other of said front cabinet and said rear cabinet at a position corresponding to a position of said engagement portion, wherein said front cabinet and said rear cabinet are assembled together by introducing said second member into said gap so that sliding contact between said second member and said inclined portion deflects both said first member and said second member until said engaging surface of said engagement portion engages said engagement aperture of said engaged portion.

2. A cabinet for a monitor device as claimed in claim 1, wherein one of said front cabinet and said rear cabinet with said engagement portion formed thereon has a release opening formed therein adjacent to said engagement portion for releasing said engagement portion from said engaged portion.

3. A cabinet for monitor device as claimed in claim 2, wherein said engaged portion has a second inclined portion formed on an end thereof for cooperating with said first inclined portion during assembly.

4. A cabinet for monitor device as claimed in claim 3, wherein one of said front cabinet and said rear cabinet has a guide line formed thereon extending along its inner periphery of an opening portion thereof and the other of said front cabinet and said rear cabinet has a guide portion formed thereon in the upper inner wall portion at a predetermined interval to facilitate engagement of said front cabinet and said rear cabinet.

* * * * *